United States Patent [19]
Alanara et al.

[11] Patent Number: 5,594,797
[45] Date of Patent: Jan. 14, 1997

[54] VARIABLE SECURITY LEVEL ENCRYPTION

[75] Inventors: Seppo Alanärä, Oulu, Finland; Thomas Berson, Palo Alto, Calif.

[73] Assignee: Nokia Mobile Phones, Salo, Finland

[21] Appl. No.: 394,537

[22] Filed: Feb. 22, 1995

[51] Int. Cl.⁶ .................................................. H04L 9/00
[52] U.S. Cl. ............................... 380/28; 380/37; 380/43; 380/49
[58] Field of Search ............................ 380/28, 29, 37, 380/42, 43, 49

[56] References Cited

U.S. PATENT DOCUMENTS

| | | | |
|---|---|---|---|
| 5,091,942 | 2/1992 | Dent | 380/46 |
| 5,153,919 | 10/1992 | Reeds, III et al. | 380/44 |
| 5,159,634 | 10/1992 | Reeds, III | 380/42 |
| 5,172,414 | 12/1992 | Reeds, III et al. | 380/45 |
| 5,241,599 | 8/1993 | Bellovin et al. | 380/21 |
| 5,392,355 | 2/1995 | Khurana et al. | 380/23 |
| 5,455,861 | 10/1995 | Faucher et al. | 380/9 |
| 5,483,596 | 1/1996 | Rosenow et al. | 380/25 |
| 5,506,889 | 4/1996 | Gustafson et al. | 380/28 |
| 5,517,567 | 5/1996 | Epstein | 380/21 |

*Primary Examiner*—David C. Cain
*Attorney, Agent, or Firm*—Philip H. Albert; Townsend and Townsend and Crew LLP

[57] ABSTRACT

A method and apparatus for digital cellular telephone encryption includes a switch when a choice between compatibility security and a higher security is required. Plaintext is converted into ciphertext using a three-stage transformation process. In a first stage, the plaintext is transformed using a secret key to control encrypting by an invertible transformation process. In a second stage, the output of the first stage is transformed by an involutory transformation, which is unkeyed when the compatibility switch is in a compatibility setting and keyed when the compatibility switch is in a secure setting. In a third stage, the output of the second stage is transformed by the inverse of the transformation performed in the first stage. The compatibility switch is used to toggle between compatibility with a less secure encryption standard and a key-based secure encryption.

9 Claims, 8 Drawing Sheets

VARIABLE SECURITY LEVEL ENCRYPTION

BACKGROUND OF THE INVENTION

The present invention relates to the field of digital data encryption. More specifically, in one embodiment, the invention provides for the encryption of voice and data transmitted over a digital cellular telephone network to varying levels of security.

Providing encryption for cellular telephone conversations and cellular telephone signalling data is known. For example, U.S. Pat. No. 5,159,634 shows a system for encrypting command messages in a cellular telephone network. In that system, messages are encrypted at a telephone using a secret key, then transmitted to a base station and decrypted there using the secret key. The messages are encrypted in three stages. In the first stage, the message is transformed using the secret key through an invertibis encryption function. In the second stage, the output of the first stage is transformed through an involutory transformation. In the third stage, the output of the second stage is transformed through an encryption function which is the "inverse" of the invertibis encryption function.

An involutory transformation is such that when an input is transformed through the transformation into an output and the output is transformed through the same transformation, the original input results. In the system disclosed in U.S. Pat. No. 5,159,634, the involutory transformation does not depend on any particular key; the particular output depends only on the input and the particular interconnections of the transformation.

One disadvantage of such a system is that a message transformed by the system might be relatively easy to decrypt without even without knowing the secret key ahead of time.

The use of multiple stage encryption systems with more secure decoding is known. For example, the Enigma machines widely used in Germany in World War II used an array of rotors with particular transformations determined by the electrical connections of each rotor. One rotor was a "reflecting" rotor which had the effect of an involutory transformation. The secret keys of the encryption were essentially the choice of rotors, their positions and the internal wiring of the rotors.

In operation, coded messages were generated on one Enigma machine, usually recorded on paper to be transported or transmitted to a message receiver, and decoded by the message receiver using another Enigma machine. The compatibility of the message and the machines used to encode and decode messages was easily solved simply by having all the Enigma machines operate the same way. However, today such simplicity is not possible.

Cellular telephones must be able to operate in many different environments and be compatible with many different manufacturers' equipment, as well as many different regulatory schemes in different countries where cellular telephones are used. For example, in the U.S. the ability for law enforcement agencies to be able to decode messages without secret keys is often given priority over privacy, and therefore the encryption must be reasonably easy to decrypt. However, in other countries, more secure systems might be demanded or required.

Therefore, there is a need for cellular telephone equipment which can be used in a variety of regulatory environments with varying levels of security for message transmission as well as compatibility with cellular telephone standards which may exist.

SUMMARY OF THE INVENTION

According to the invention, a method and apparatus for digital cellular telephone message encryption employs a selected involutory transformation. In one embodiment, plaintext data is converted into ciphertext data using a three stage transformation process. In a first stage, the plaintext is transformed according to an encrypting process which uses a secret key to control the encrypting process; in a second stage, the output of the first stage is transformed according to an involutory transformation; and in a third stage, the output of the second stage is transformed according to a transformation which is the inverse of the transformation performed in the first stage. The involutory transformation in the second stage is optionally an unkeyed or a keyed transformation, depending on the state of a compatibility switch.

The compatibility switch allows a single apparatus to operate in different digital cellular telephone environments. If the compatibility switch is set to a compatibility setting, the unkeyed transformation is used in order to be compatible with a less secure encryption standard, but if the compatibility switch is set to a secure setting, the keyed transformation is used in order to allow for more secure encryption. One advantage is that in manufacturing, only one cellular telephone apparatus according to the present invention need be manufactured to use a cellular telephone in an area using the less secure standard or in an area using a more secure standard.

A further understanding of the nature and advantages of the invention herein may be realized by reference to the remaining portions of the specification and the attached drawings.

DESCRIPTION OF THE PREFERRED EMBODIMENTS

Figure 1:
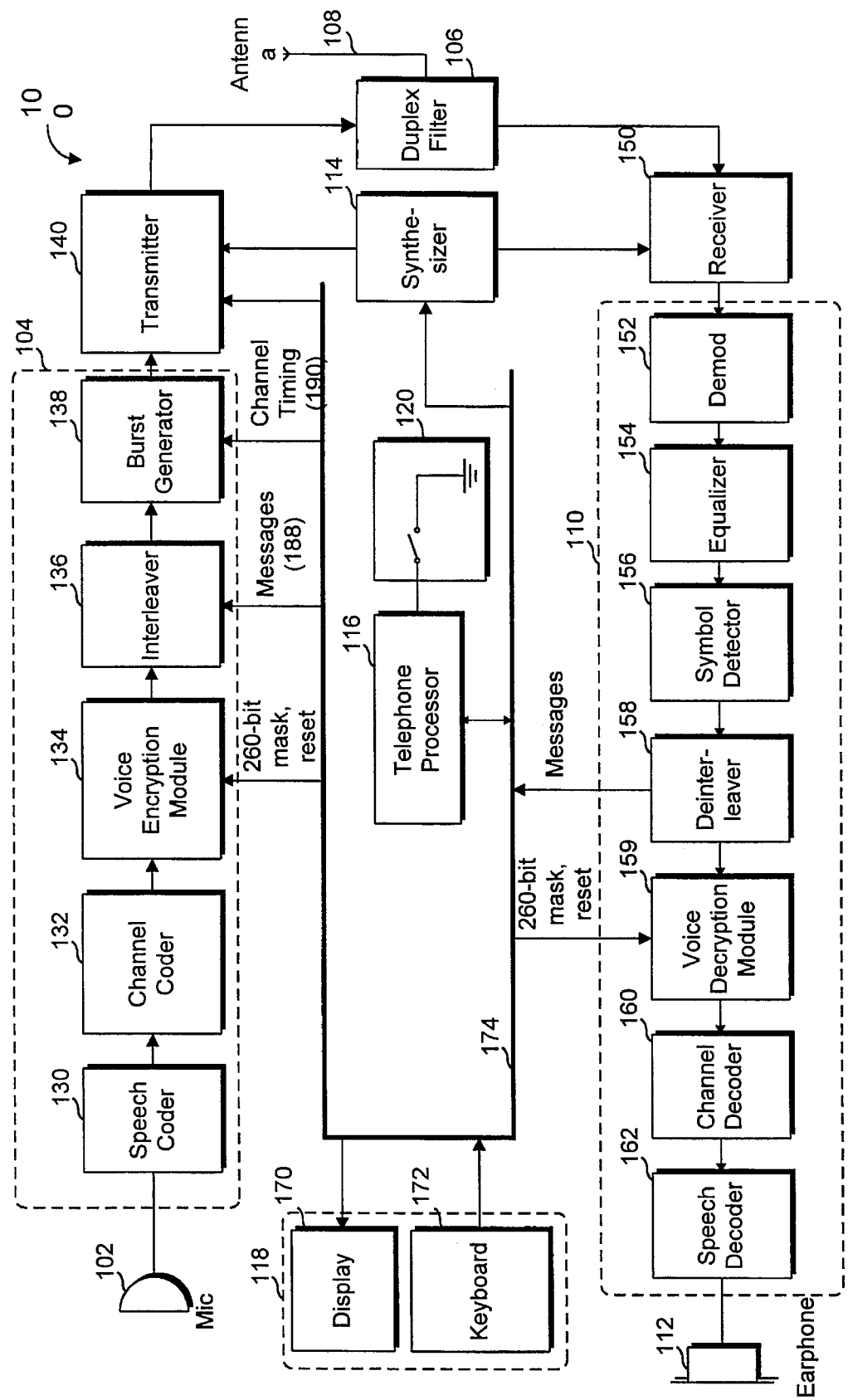
FIG. 1 is a block diagram of a cellular telephone showing a telephone processor, and various signal processing elements according to the present invention.

FIG. 1 is a block diagram of the internal circuitry of a cellular telephone 100 according to the present invention. Cellular telephone 100 transmits voice and other sound information to a base station (not shown) and receives similar information from the base station and provides it to a user of cellular telephone 100. Cellular telephone 100 is also capable of receiving and transmitting message blocks which convey information and instructions in both directions between cellular telephone 100 and the base station. While a cellular telephone can be used to transfer facsimile images, modem signals, DTMF signals, etc., in addition to voice, the example here is described with reference to the transfer of voice, with the understanding that other uses are also possible.

As shown, cellular telephone 100 includes a microphone 102 which converts sounds into electrical signals, a transmission subsystem 104 which converts those electrical signals into a baseband signal, a transmitter 140 which modulates the baseband signal onto a carrier wave, a duplex filter 106 which transfers the modulated transmission carrier onto an antenna 108 while transferring a received radio signal received from antenna 108 to a receiver 150.

Receiver 150 and transmitter 140 receive a carrier frequency signal from a synthesizer 114. Receiver 150 receives the received radio signal and recovers an incoming baseband signal, which it transfers to a reception subsystem 110, which receives the incoming baseband signal and converts it to electrical signals suitable for conversion into sounds by an earphone 112 and message blocks for interpretation by cellular telephone 100. Cellular telephone 100 also includes a telephone processor 116 for controlling various elements of cellular telephone 100 and an I/O subsystem 118 for handling user interaction with telephone processor 116. Telephone processor 116 also accepts an input from a compatibility switch 120. In some embodiments, compatibility switch 120 is implemented as a bit in a memory, such as a ROM (Read Only Memory).

In the embodiment shown, telephone processor 116 interacts with the various elements over a bus 174, and generally controls most of the elements shown in FIG. 1. Of course, in some embodiments, transmitter 140, receiver 150, duplex filter 106 and antenna 108 are not controlled by any processor, but are simple hardware circuit components. In addition to controlling these various elements, telephone processor 116 acts on received message blocks and generates transmitted message blocks. Message blocks have many uses, such as indicating the start of a call and a called telephone number, which the base station uses to complete a call, or periodically identifying the telephone to a base station.

Transmission subsystem 104 is shown comprising several modules used to digitally process voice signals from microphone 102 into the baseband signal provided to transmitter 140, including a speech coder 130, which digitizes voice signals into a stream of digital voice samples and encodes these digital voice samples using a speech coding system, such as Motorola's VSELP (Vector-Sum Excited Linear Predictive) speech coding system to form a stream of VSELP coded samples, a channel coder 132, which convolutionally encodes the resulting stream and adds error correction data, a voice encryption module 134 which encrypts the data in the stream, an interleaver 136 which interleaves the data in the stream to protect against fading errors while multiplexing message blocks destined for the base station into the data stream, a burst generator 138 for synchronizing bits in the data stream with transmission time windows in a time-division multiplexing scheme commonly used in digital cellular telephone networks and for adding synchronization bits to the data stream.

In transmission subsystem 104, voice encryption module 134, interleaver 136 and burst generator 138 are all shown coupled to telephone processor 116 via bus 174. Module 134 receives a counter reset signal and a 260-bit mask from telephone processor 116. Interleaver 136 receives message data from telephone processor 116 over line 188. Burst generator 138 receives timing information from telephone processor 116 to indicate where the time slots are for the cellular telephone's transmissions. For an exemplary implementation of this, see EIA/TIA Interim Standard, "Cellular System Dual-Mode Mobile Station—Base Station Compatibility Standard", IS-54, published May 1990 as updated by IS-54-A, published March 1991 ("IS-54"), and IS-54-B, published July 1992.

Reception subsystem 110 is shown comprising several modules used to process the baseband signal received from receiver 150 into voice signals for output to earphone 112 and messages blocks provided to telephone processor 116. Reception subsystem 110 includes a demodulator 152 for recovering a data signal from the received baseband signal down converted radio signal, an equalizer 154 to compensate for possible time dispersion, a symbol detector 156 for recovering a digital bit stream, a deinterleaver 158 for rearranging the digital bit stream into its intended order and separating out message blocks from the digital bit stream, a voice decryption module 159 for converting the remaining bit stream from ciphertext to plaintext, a channel decoder 160 for removing convolutional encoding, and detecting and correcting errors, and a speech decoder 162 for converting the resulting digital data stream into a voice signal for presentation to earphone 112.

Deinterleaver 158 and voice decryption module 159 are shown coupled to telephone processor 116 via bus 174. Deinterleaver 158 is coupled to telephone processor 116 to provide message blocks extracted from the received data stream, and voice decryption module 159 is coupled to telephone processor 116 to receive a decoding bit mask and a reset signal.

I/O subsystem 118 comprises a display 170 and keyboard 172, each of which are coupled to telephone processor 116. Keyboard 172 typically comprises 12 digit keys in a normal telephone arrangement plus additional function keys. Display 170 typically comprises a multi-character alphanumeric display formed of LED lamps or an LCD panel.

In operation, an analog voice signal is detected by microphone 102 and provided to speech coder 130, which converts the analog voice signal into a stream of digital voice signal samples. Channel coder 132 convolutionally encodes those samples and adds cyclic redundancy check (CRC) bits to the stream for error detection and correction. Speech coder 130 and channel coder 132 operate together to partially convolutionally encode bits, adding a CRC to the most important bits, just convolutionally encoding some bits, and not coding less important bits (no channel coding). Voice encryption module 134 encrypts the coded stream using the encryption mask provided by telephone processor 116. Bits of the mask are exclusive OR'ed (XOR) with the stream to encrypt the voice signals. A 260-bit mask is used here, although other lengths can be used if both ends of a communication agree. For the XOR operation, one bit is taken from the input and one bit is taken from the mask. Thus, the masking sequence repeats every 260 bits. Telephone processor 116 also supplies a reset signal to indicate to voice encryption module 134 where the sequence of mask bits should begin. Typically, the mask is constant during a telephone call and changes from call to call. As should be apparent, an unencrypted conversation, if needed, can occur by simply setting the mask to all zeroes, and that when an XOR is used decryption is the same operation as encryption.

Voice encryption module 134 transfers the encrypted bit stream to interleaver 136 which, to protect against Rayleigh fading, interleaves the data bits of the stream at least to a depth of two time slots, where time slots are, for example, 324-bit time windows in a time-division multiplexed communication system with six time channels and two assigned to the user of cellular telephone 100. Of the 324 bits, 260 are available for data, 52 bits are used for synchronization and 12 bits are reserved for future use. A message is 48 bits plus 16 CRC bits and one control bit. These 65 bits are convolutionally coded by a rate ¼ code to make 260 bits. Interleaver 136 also multiplexes message data into the bit stream. The interleaved data stream is then provided to burst generator 138, which sets up the timing of bits in the bit stream to correspond with the time slots allocated to cellular telephone 100, and from there to transmitter 140. Because it is interleaved, the message data uses time slots which cannot be used by voice data. Other messages, in a Slow Associated Control Channel (SACCH), are sent in a continuous logical channel formed by the reservation of 12 bits in each TDMA slot (voice or FACCH message slots). The messages sent on the SACCH channel are generally not encrypted because the communicate information which is not particularly sensitive, such as power levels, time alignment changes, neighboring channel measurement information, etc.

Transmitter 140 is implemented using an RF modulator, an up converter and a power amplifier. The RF modulator modulates a carrier frequency according to $\pi/4$ differential QPSK modulation ($\pi/4$ shifted, differentially encoded quadrature phase shift keying). In this QPSK technique, data bits are grouped in pairs, presented as a single symbol per pair and transmitted as one of four possible phase changes selected from $\pm\pi/4$ and $\pm 3\pi/4$. Frequency synthesizer 114 generates the channel injection frequency which is mixed with the modulated carrier frequency to produce the actual transmission signal. The power amplifier of transmitter 140 is only turned on for the duration of the allocated time slot. The transmitted power level is monitored and controlled by telephone processor 116. The transmitted signal from transmitter 140 is filtered in duplex filter 106 to remove harmonic products. A separate filter and antenna switch could also be used instead of duplex filter 106. The signal is then transmitted to the base station in a cellular telephone network (not shown) by antenna 108.

In reception subsystem 110, the received baseband signal is filtered and demodulated by demodulator 152 to recover the $\pi/4$ QPSK modulated signal. The QPSK modulated signal is then equalized by equalizer 154 to correct for the possible time dispersion due to different signal propagation conditions. The equalized symbols output by equalizer 154 are then detected by symbol detector 156 and deinterleaved by deinterleaver 158. This produces, at the output of deinterleaver 158, a digital voice data stream which might have been output by an encryption module 134 of another cellular telephone or the base station. Deinterleaver 158 removes message blocks from the data stream.

Deinterleaver 158 is able to separate message blocks from voice blocks by assuming that the data in a received slot contains speech and checking the speech CRC. If it fails, the block is deinterleaved as a message. The message block contains its own 16-bit message CRC. An example of this is shown in ¶2.2.2.2.3.2 of IS-54, rev. B.

The output of deinterleaver 158 passes through voice decryption module 159 and its decrypted output is provided to channel decoder 160. Channel decoder 160 decodes the convolutionally encoded signal, correcting errors as necessary. After decoding, a CRC check is performed. If the CRC bits are correct, the decoded signals are assumed to be speech, and are then provided to speech decoder 162 which converts the signals to analog speech signals to be output by earphone 112.

In this way, voice signals from microphone 102 and message blocks from telephone processor 116 are sent over the cellular telephone radio network and voice signals and message blocks are received and provided to earphone 112 (voice) and telephone processor 116 (messages). Messages include call handling instructions, cell registration and location information, telephone identification messages and instructions to update secret keys. Typically, the 260-bit mask used for voice encryption is calculated from one or more of these other data provided to cellular telephone 100. Thus, encryption of message blocks and voice signals is important to prevent unauthorized interception of conversations, unauthorized control of cellular telephone 100 and impersonation of a cellular telephone user. In an operative system, the base station includes a corresponding encryption and decryption system, so that the data traffic from cellular phones can be interpreted.

Telephone processor 116 controls the various functions of cellular telephone 100, including detecting inputs at keyboard 172, displaying information on display 170 and controlling the operation of voice encryption module 134, voice decryption module 159, interleaver 136, deinterleaver 158, burst generator 138, compatibility switch 120, transmitter 140 and synthesizer 114. When a message is to be transmitted, the message is passed from telephone processor 116 to interleaver 136. When a message is detected, it is extracted from the data stream of reception subsystem 110 by deinterleaver 158 and passed to telephone processor 116, which takes the appropriate action.

Figure 2:
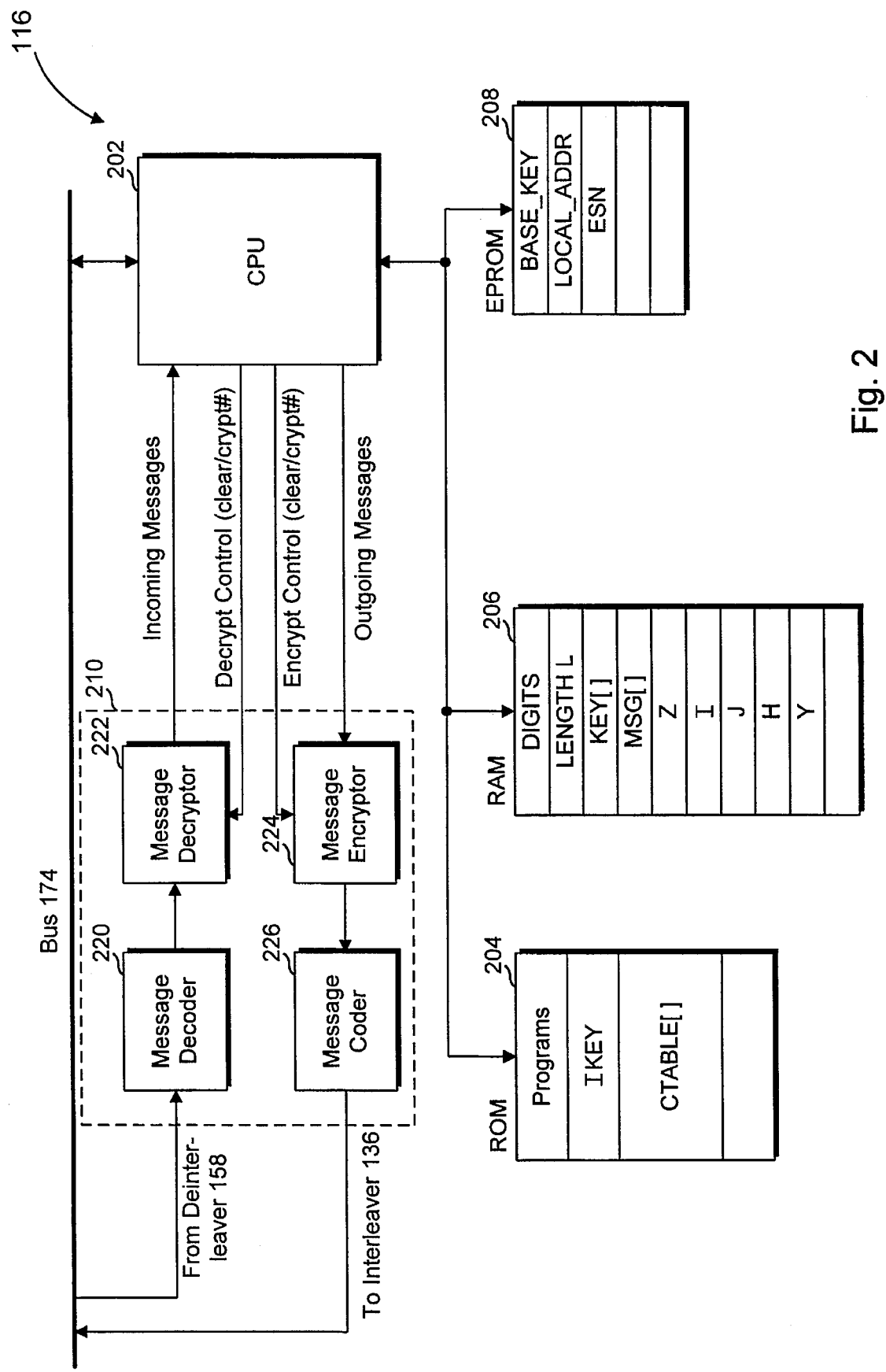
FIG. 2 is a more detailed block diagram of the telephone processor shown in FIG. 1.

FIG. 2 is a block diagram of telephone processor 116, in which a central processing unit (CPU) 202 communicates with a ROM 204, a random access memory (RAM) 206, an erasable programmable ROM (EPROM) 208, and a message processing subsystem 210. ROM 204 is used for storing data values which do not change; RAM 206 is used to store data values which are expected to change as data is processed; and EPROM 208 stores values which are not expected to change frequently and which are preserved when power to cellular telephone 100 is removed. In some embodiments, EPROM 208 is a flash memory or an electrically-erasable PROM (EEPROM), although conventional EPROM which requires ultraviolet light for erasures might be used where erasures are only done in a location where ultraviolet light is readily available.

ROM 204 stores software programs to be executed by telephone processor 202, IKEY, a secret involution key value, CTABLE[], an array of cryptographic key values, and other constant data fields as needed. RAM 206 stores current values for the variables DIGITS, LENGTH, the arrays KEY[] and MSG[], intermediate process variables Z, I, J, H and Y, and other temporary values as needed. The variable DIGITS holds the currently dialed number. The variable LENGTH ('L' for short), indicates the length of a message, in bytes, being encrypted or decrypted. The array KEY[] holds an eight byte key value derived from a BASE_KEY variable stored in EPROM 208. The array MSG[] is an array of L bytes for holding a message being encrypted or decrypted. Variables Z, I, J, H and Y are used as indicated in FIGS. 5(A), 5(B), 5(C) and 6. EPROM 208 stores an electronic serial number (ESN) for cellular telephone 100, a unique identifier (LOCAL_ADDR) of cellular telephone 100 (which in many cases is the area code and telephone number of the cellular phone), and a secret number (BASE_KEY), as well as any other semi-permanent values needed to be stored. In an alternate embodiment, some of these stored values are stored on a removable memory card.

Message processing subsystem 210 includes a message decoder 220 coupled to receive the message data stream from deinterleaver 158, a message decryptor 222 which receives decoded messages from message decoder 220 and, depending on the state of a DECRYPT/CLEAR# signal output by CPU 202, either passes the decoded messages unchanged to CPU 202 or decrypts them before passing them on. Message processing subsystem 210 also includes a message encryptor 224 coupled to CPU 202, which either encrypts or passes unchanged a message block to a message coder 226. Message coder 226 is a convolutional coder similar to channel coder 132, and encodes the output of message encryptor 224 and passes the resulting data stream to interleaver 136.

Figure 3:
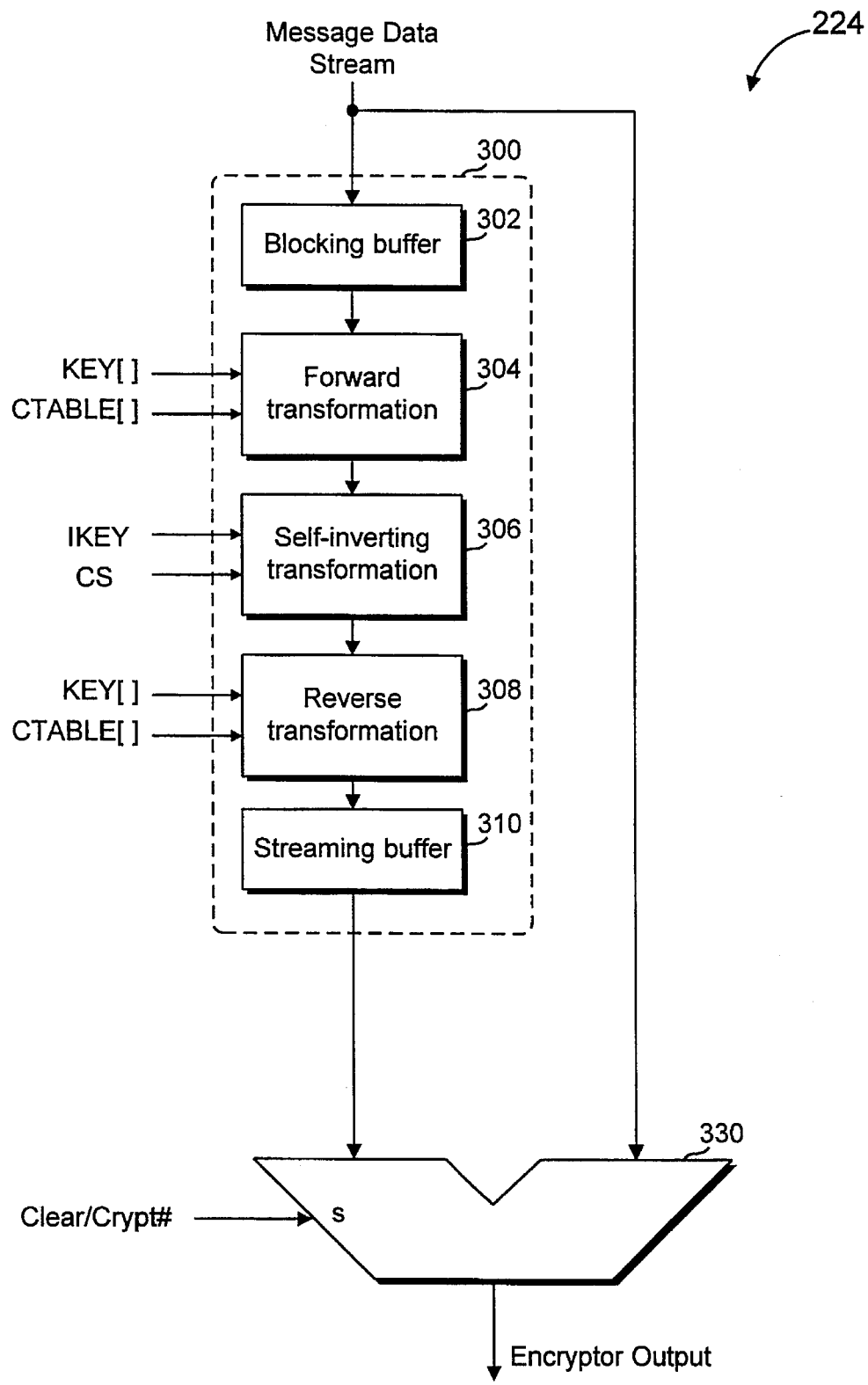
FIG. 3 is a more detailed block diagram of the message encryptor shown in FIG. 1.

The details of the internal operation of message encryptor 224 are shown in FIG. 3. In operation, a message stream is extracted from the incoming input stream, where the message stream has been convolutionally coded with error detection and correction bits added. Once message decoder 220 detects and corrects errors as needed and reorders the message bit stream into its intended order, a portion or all of the message bit stream is decrypted. CPU 202 can control message decryptor 222 so that only the appropriate message blocks or portions of message blocks are decrypted. This control is provided over control lines from CPU 202 to decryptor 222 which include an CRYPT/CLEAR# line to signal whether or not to decrypt, and a line or lines to communicate values used in the encryption/decryption process, as shown in FIG. 3.

Although FIG. 2 shows generally a one-way system, an actual implementation might include the ability for the message stream to be "rolled back" so that an operation can be performed on earlier arriving data in the stream where the operation is dependent on later arriving data in the data stream.

FIG. 3 is a detailed block diagram of message encryptor 224. Message encryptor 224 accepts a message data stream from CPU 202 and outputs a message data stream which is either the same as its input or an encrypted version of the input message data stream. As should be apparent, if the CRYPT/CLEAR# line is set to CRYPT and the input is a plaintext data stream, the output will be a ciphertext data stream. Likewise, if the line is set to CRYPT and the input is a ciphertext data stream encoded with the same control information used to encrypt the ciphertext, the output will be a plaintext data stream. Thus, a decrypt operation is the same as an encrypt operation. The user of mobile telephone 100 can select whether or not to use the encryption feature.

Message encryptor 224 includes a blocking buffer 302 for grouping bits of the message data stream into discrete data blocks, a forward transformation module 304, a self-inverting transformation module 306, a reverse transformation module 308, a streaming buffer 310 for reversing the effect of blocking buffer 302, each connected in series, and a multiplexer 330 with one input being the output of streaming buffer 310 and the other input being the input to message encryptor 224. With this arrangement, the message data stream is either encrypted and passed on or passed on unencrypted.

Blocking buffer 302 assembles blocks of data from the message data stream so that further modules within message encryptor 224 can operate on data one block at a time. In one embodiment, a message block is reorganized into an L byte block, where L is typically 256, or another fixed or variable integer. Once 8 L bits are accumulated in blocking buffer 302, the block is passed to forward transformation module 304. If necessary, a message is padded to fill an whole number of octets (bytes).

Forward transformation module 304 accepts the block and KEY[] as its input. KEY[] is provided to message encryptor 224 by CPU 202, which reads KEY[] from RAM 206. The transformation which occurs in forward transformation module 304 is described in a flowchart shown in FIG. 5(a). Once the block is so transformed, it is passed to self-inverting transformation module 306 which obtains IKEY and CS (the position setting of compatibility switch 120) from CPU 202 and transforms the block obtained from module 304 according to the flowchart shown in FIG. 5(B). Once the block is so transformed, it is passed to reverse transformation block 308, which transforms the block provided according to KEY[] as shown in FIG. 5(C).

The transformation provided by reverse transformation module 308 is the inverse transformation performed by forward transformation module 304. In other words, a block provided to forward transformation module 304 and then immediately provided to reverse transformation module 308 will result in the original input block. The key inputs for module 304 and module 308 are the same, namely KEY[].

Once the block is output from reverse transformation module 308, it is provided to streaming buffer 310 which parses out the bits of the message block to recreate a data stream. This data stream is then provided to one input of message stream multiplexer 330. Depending on the setting of the CRYPT/CLEAR# line, multiplexer 330 either outputs an encrypted message data stream or passes its input straight through.

In one implementation of cellular telephone 100, the transformations performed by message encryptor 224 are actually performed in software by CPU 202 or other digital signal processor. In fact, if CPU 202 is a powerful enough digital signal processor (DSP), it could perform a variety of functions for elements of transmission subsystem 104 and reception subsystem 110 which are shown separately in FIG. 1. In the following examples, the transformations performed by message encryptor 224 are assumed to be performed by CPU 202.

Figure 4:
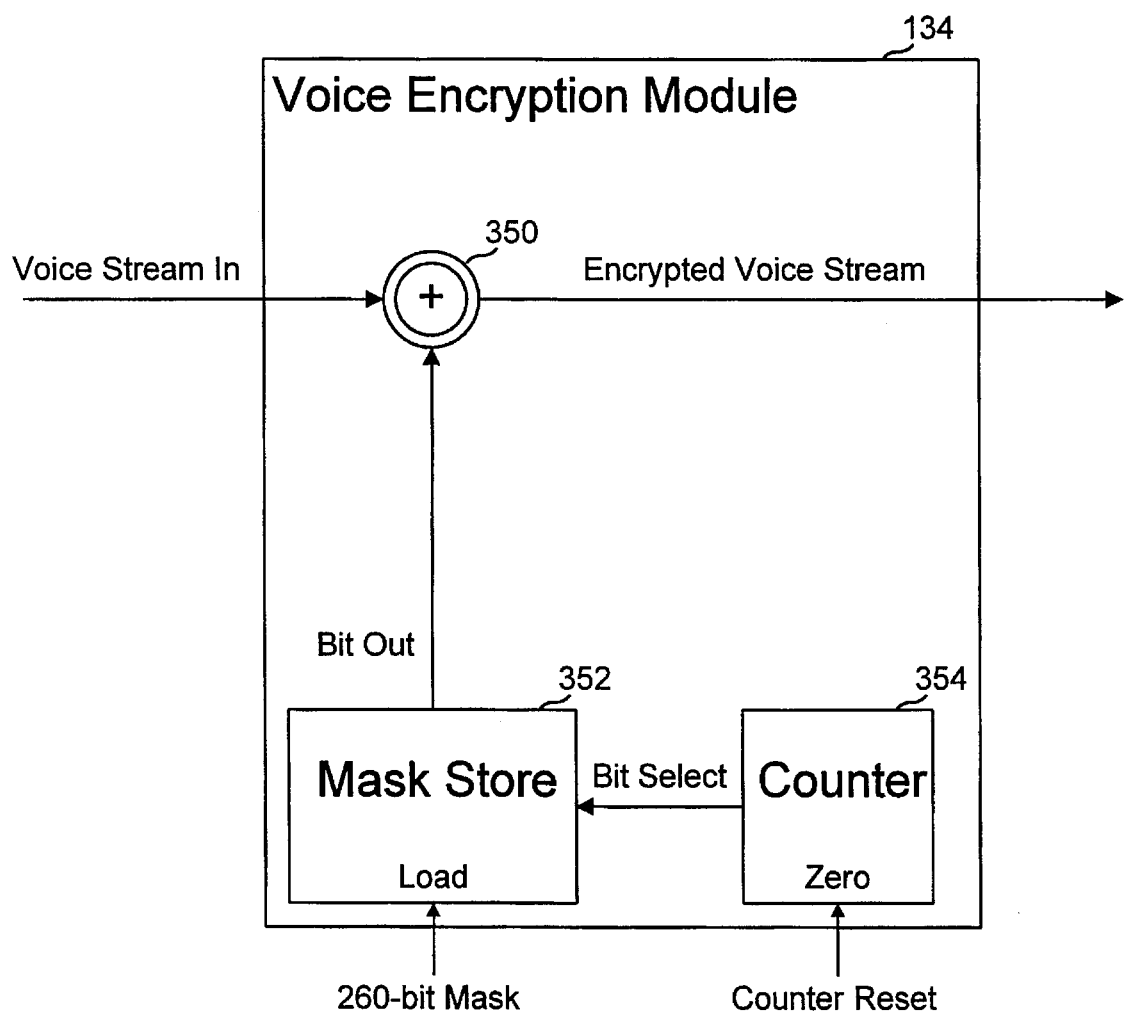
FIG. 4 is a more detailed block diagram of the voice encryption module shown in FIG. 1.

FIG. 4 shows voice encryption module 134 in greater detail, comprising an XOR adder 350, a mask storage register 352, and a counter 354. Voice encryption module 134 has two control inputs, one for obtaining a mask value from telephone processor 116 and one to receive a reset signal from telephone processor. The reset signal is an input to counter 354, and the mask input is an input to mask storage register 352.

In operation, a mask value is XOR'ed with the voice bit stream. This mask value is provided by telephone processor 116 and is stored in mask store register 352. After counter 354 is reset, it begins counting up bits in the voice bit stream. This count is provided to mask store register 352, which outputs the bit of the mask in the position corresponding to the count. The bit output by mask store register 352 is applied to XOR adder 350 which has the voice input as its other input. In this way, the voice bit stream is XOR'ed with the mask as synchronized by the reset signal.

Figure 5A:
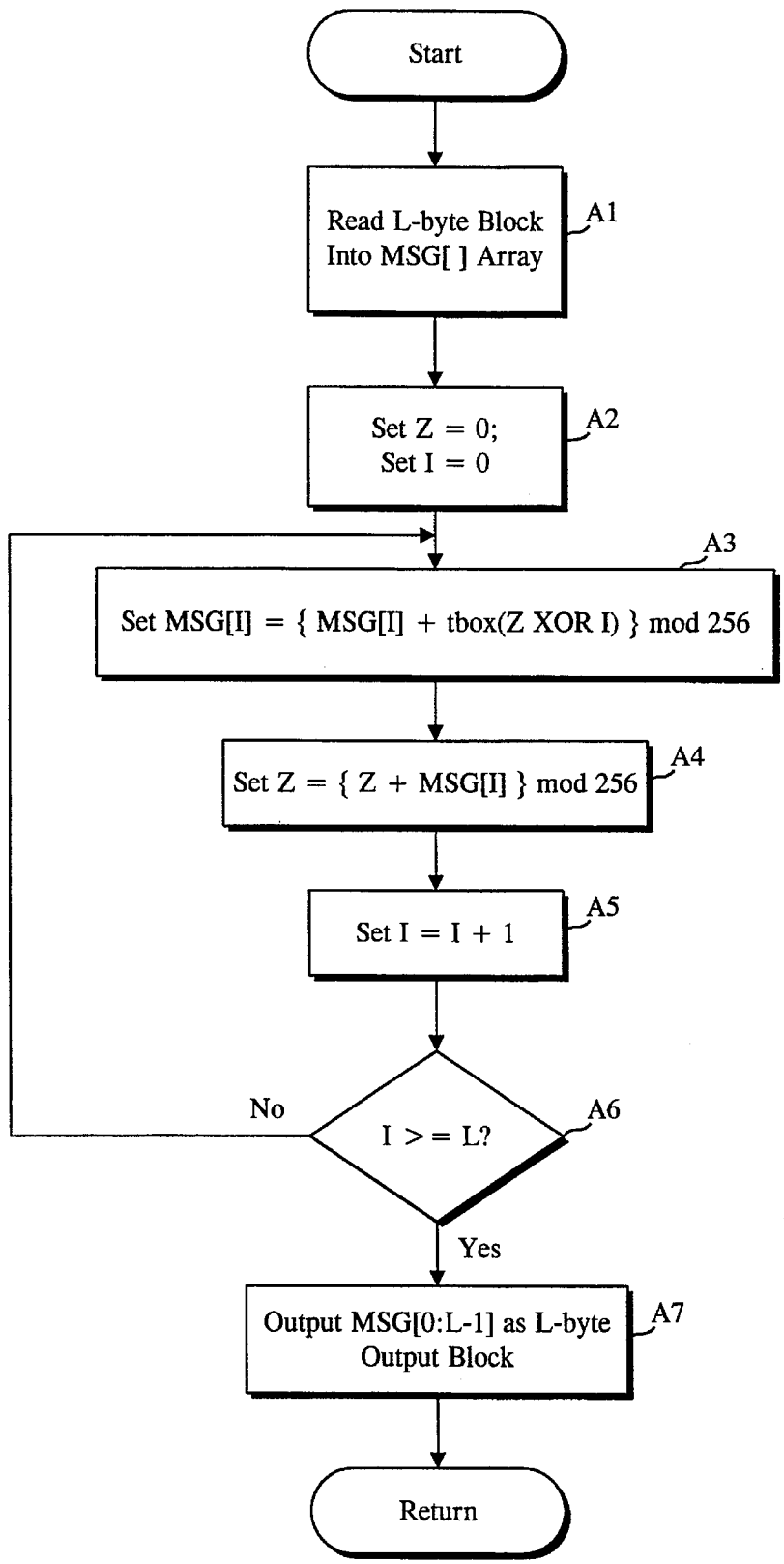
FIG. 5 (5(A), 5(B), 5(C)) is set of flowcharts illustrating a process for encrypting and decrypting message data blocks according to the present invention.
Figure 5B:
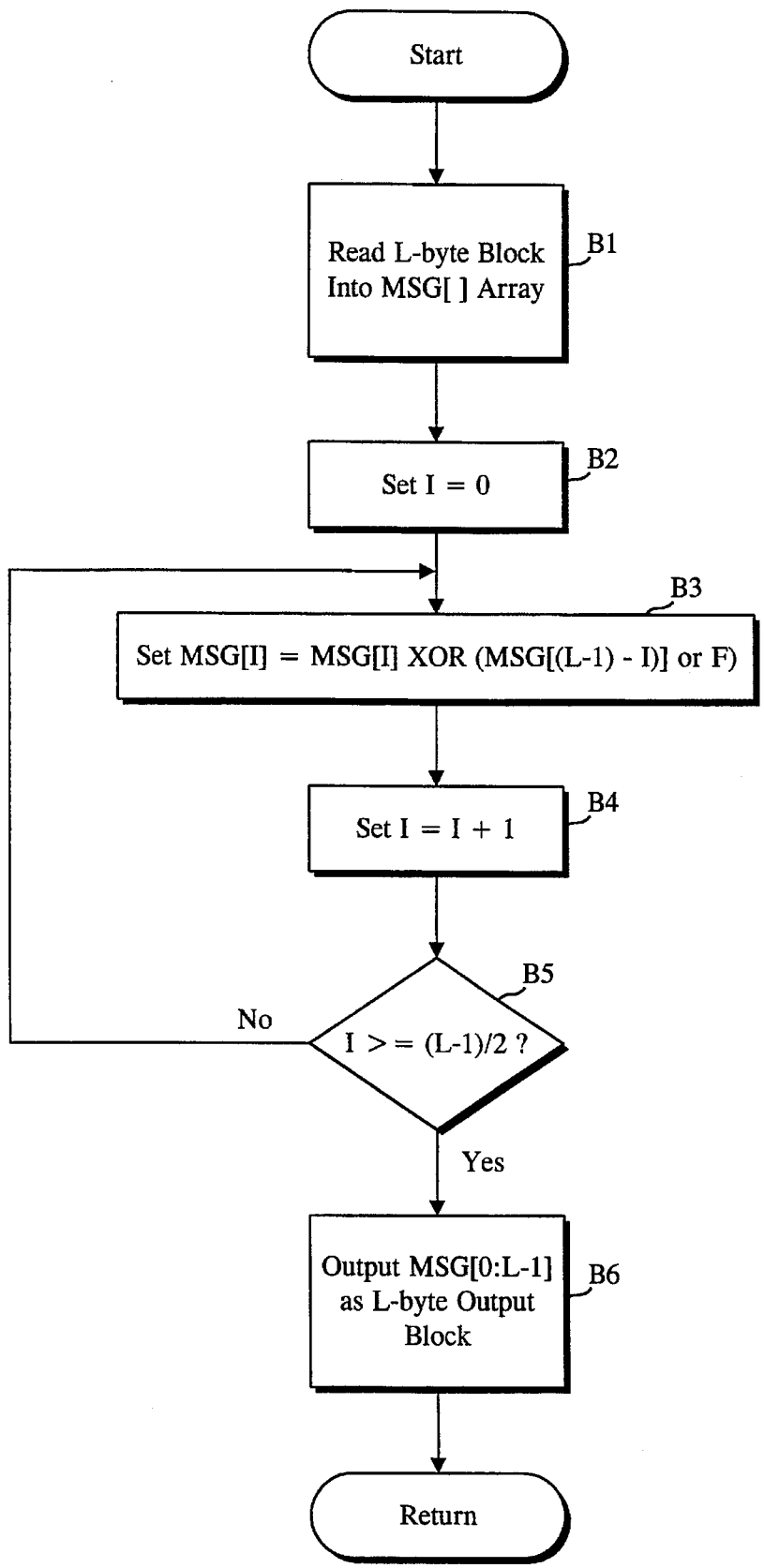
Figure 5C:
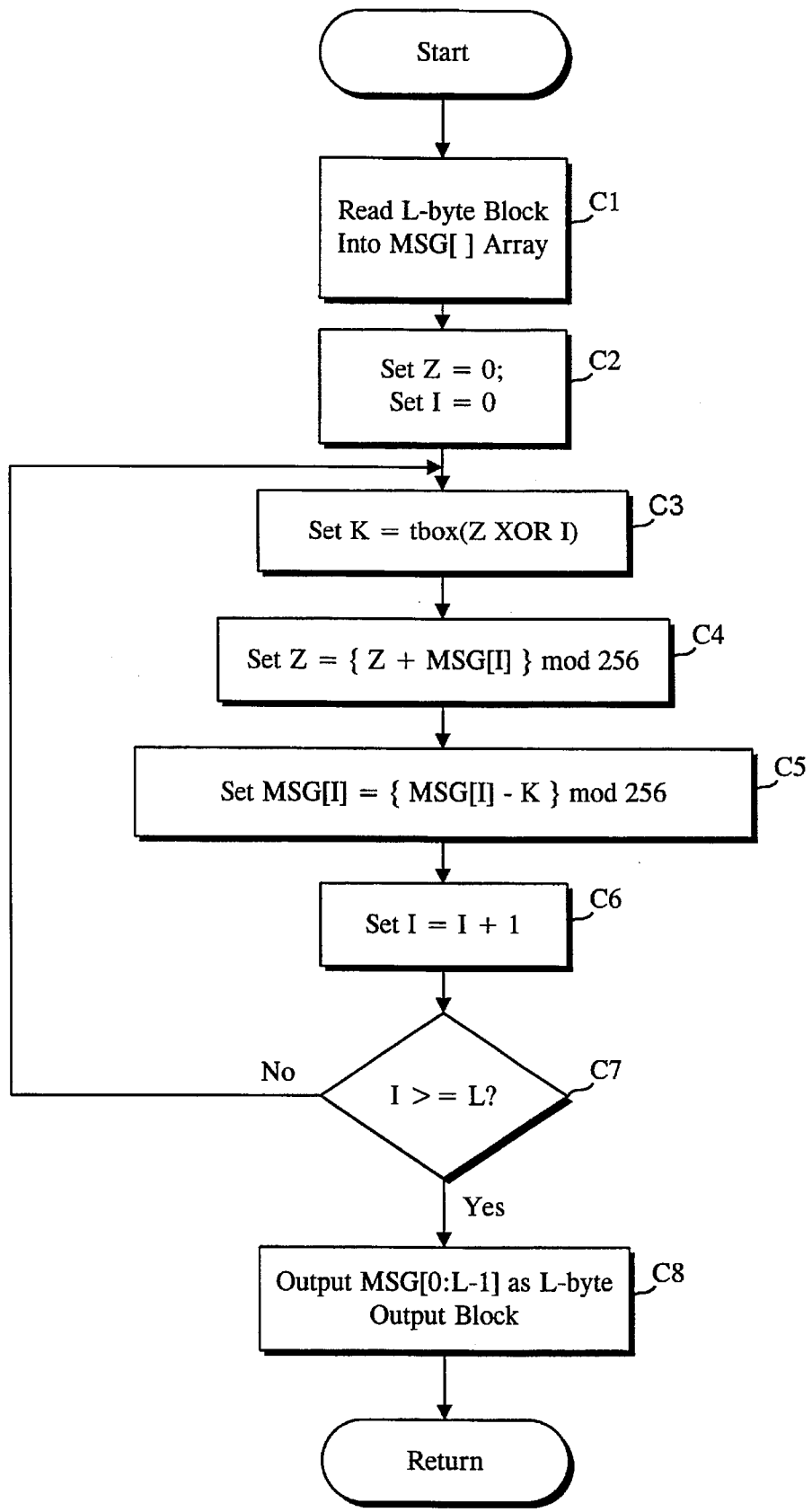

FIGS. 5(A), 5(B) and 5(C) describe the transformations performed by message encryption subsection 300; FIG. 5(A) describes the forward transformation; FIG. 5(B) describes the self-inverting transformation, and FIG. 5(C) describes the reverse transformation. With this description, it should be apparent that these three transformations applied in series will provide an encrypted ciphertext block when an unencrypted plaintext block is input, and will provide a decrypted plaintext block when an encrypted ciphertext block is input and the key values for the transformations are those which were used to encrypt the ciphertext.

FIG. 5(A) shows the forward transformation process. First, an L-byte (8 L bits) input block is read into the array MSG[] (Step A1). Then, a temporary variable, Z, and a loop counter, I, are initialized to zero (Step A2). Thereafter, the $I^{th}$ element of the array MSG[] is modified according to the relation:

MSG[I]={MSG[I]+tbox(Z XOR I)}mod 256

(Step A3). The temporary variable Z is then modified according to the relation:

Z={Z+MSG[I]}mod 256 (A4)

where tbox() is a function which returns a value derived from the function input parameter and the values of KEY[] and CTABLE[] provided as inputs to the transformation. In some implementations, for computing efficiency, the value of tbox() for each function input parameter and fixed values of KEY[] and CTABLE[] are calculated and stored in a look up table. The calculation of tbox() from these values is explained in connection with FIG. 6.

Once these values have been modified, the loop counter I is incremented (A5), and its value is checked (A6) to see if each of the L bytes have been modified by Step A3. If not, loop counter I will be less than L, and the next byte is processed (A3). If all L bytes have been processed, the transformed block, which is stored in MSG[], is output (A7).

FIG. 5(B) shows the self-involutory transformation process. As described, the three transformation processes are carried out in series, and so the temporary arrays and variables used for a transformation can be used for other transformations. Of course, if these transformations were to be done by a parallel processing system or a multiple processor system, separate variables would be provided for each transformation.

As with the forward transformation, an L-byte input block is first read into the array MSG[] (B1), and then the loop counter I is initialized to zero (B2). Thereafter, in each pass of the loop, the $I^{th}$ element of the array MSG[] is modified according to the relation:

MSG[I]=MSG[I]XOR(MSG[(L−1)−I]OR F) (B3)

where F is function of CS and IKEY such that F=1 when CS indicates that compatibility switch 120 is in the compatibility setting, or F=IKEY when CS indicates that compatibility switch 120 is in the secure setting.

Then (B4), the loop counter I is incremented and compared to (L−1)/2 (B5). If the first half of the L elements of MSG[] have not all been modified by Step B3, then the loop counter I will be less than (L−1)/2 and the process will continue at Step B3 for the next element of MSG[]. However, if I is not less than (L−1)/2, then the requisite number of elements have been processed and the contents of MSG[] are output (B6).

Because of the operation of Step B3, the transformation of the data in MSG[] is self-involutory, meaning that when any given block of L bytes is transformed according to the transformation shown in FIG. 5(B), and the resulting block is again so transformed, the original given block will result.

According to the invention, the self-involutory transformation is a function of the input block when CS indicates a compatibility setting, but the transformation is a function of both the input block and the key IKEY when CS indicates a secure setting. In this way, the transformation is a compatible unkeyed transformation or a more secure keyed transformation.

FIG. 5(C) shows the reverse transformation process. The only difference between the forward and reverse transformations is that the order of modifying MSG[I] and Z is reversed and the sign of the modification to MSG[I] is opposite (modification by adding/subtracting K or the tbox() term). Thus, it should be apparent that the transformation shown in FIG. 5(C) is the inverse of the transformation shown FIG. 5(A).

As shown, an L-byte input block is first read into the array MSG[] (C1), then the variables Z and I are initialized to zero (C2). Thereafter, for each I up to I=L, a temporary variable K and a variable Z are modified according to the relations:

K=tbox (Z XOR I) (C3)

Z={Z+MSG[I]}mod 256 (C4)

and then MSG[I] is modified according to the relation:

MSG[I]={MSG[I]−K}mod 256 (C5)

where tbox() is the function described above.

Following these modifications, the loop counter I is then incremented (C6) and checked (C7) to see if each of the L bytes have been modified at step C4. If they haven't, the next element of MSG[] is processed by steps C3—C7. If all L bytes have been processed, MSG[] is output (C8).

Figure 6:
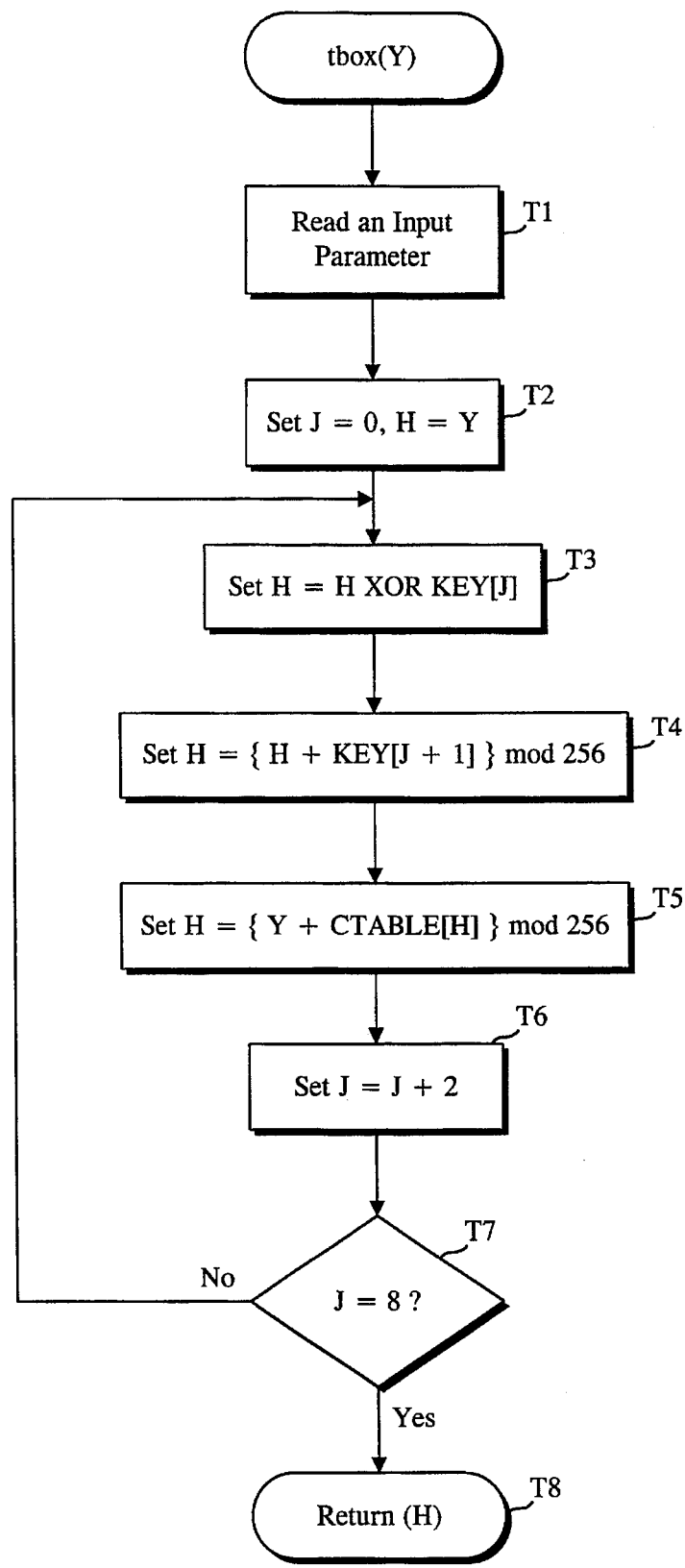
FIG. 6 is a flowchart of the creation of tbox() values used for encrypting and decrypting message data.

FIG. 6 is a flowchart showing how tbox() function values are generated for use in the processes shown in FIGS. 5(A) and 5(C). First, the input parameter is loaded into a memory area of RAM 206 labelled "Y" in FIG. 2 (Step T1), and then a temporary variable, H, is initialized to the value stored in Y and a loop counter, J, is initialized to zero (T2).

Thereafter, the temporary variable H is modified according to the relation:

H=H XOR KEY[J]

(T3) and then (T4) H is again modified, this time according to the relation:

H={H+KEY[J+i]}mod 256.

Then (T5), H is modified a third time, this time according to the relation:

H={Y+CTABLE[H]}mod 256 where CTABLE[] is the array of 256 byte elements stored in RAM 204.

The loop counter J is then incremented (T6) by two and it is checked (T7) to see if four passes have been made through Steps T3 to T6. If not, the process loops back (T3) and repeats the loop; otherwise the routine returns (T8) the latest value of H as the return value for tbox().

In summary, the above-described embodiments of a cellular telephone encrypting system provide for compatibility with other systems while still allowing the system to encrypt in a more secure manner if strict compatibility with less secure systems is not a requirement. Furthermore, all of this can be done efficiently on simple hardware.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of securely encrypting a plaintext data block into a ciphertext data block, the method comprising the steps of:

converting the plaintext data block into a first intermediate data block according to a first encrypting process which uses a first key signal as its key and the plaintext data block as its data input;

determining a state of a compatibility switch, said state being one of a compatible state or a secure state;

converting said first intermediate data block into a second intermediate data block according to a second encrypting process which uses said first intermediate data block as its data input and uses a second key signal as its key when said state is said secure state and a compatibility value as its key when said state is said compatible state, wherein said second encrypting process is an involutory transformation of its data input; and converting said second intermediate data block into the ciphertext data block according to an encrypting process which is an inverse transformation of said first encrypting process using said first key signal as its key and said second intermediate data block as its data input.

2. The method of claim 1, wherein said compatibility value is one.

3. The method of claim 1, wherein the plaintext data block is a message data block and the ciphertext data block is an encrypted message data block.

4. The method of claim 1, wherein the plaintext data block is plaintext only relative to said ciphertext block, said plaintext data having been previously encrypted for additional security.

5. A cryptographic system for transforming a message data block into an encrypted message data block, comprising:

first transformation means for transforming the message data block into a first intermediate data block, said first transformation means configured to transform a data input thereto through a first transformation according to a key input at a key input thereto;

a compatibility switch which indicates one state of a compatible state or a secure state;

second transformation means, coupled to receive said first intermediate data block from said first transformation means, for transforming said first intermediate data block into a second intermediate data block, said second transformation means configured to transform a data input thereto through a second transformation according to a key input thereto, said second transformation is an involutory transformation of its said data input;

third transformation means, coupled to receive said second intermediate data block from said second transformation means, for transforming said second intermediate data block into the encrypted message data block, said third transformation means configured to transform a data input thereto through an inverse of said first transformation according to a key input at a key input thereto;

first key application means, coupled to said key inputs of said first and third transformation means, for applying a first key to said key inputs of said first and third transformation means; and second key application means, coupled to said key input of said second transformation means and said compatibility switch, for applying a second key to said key input of said second transformation means when said compatibility switch indicates a secure state and applying a compatibility value to said key input of said second transformation means when said compatibility switch indicates a compatible state.

6. The cryptographic system of claim 5, wherein said compatibility value is one.

7. The cryptographic system of claim 5, wherein the plaintext data block is a message data block and the ciphertext data block is an encrypted message data block.

8. The cryptographic system of claim 5, wherein the plaintext data block is plaintext only relative to said ciphertext block, said plaintext data having been previously encrypted for additional security.

9. A method of securely encrypting a plaintext data block into a ciphertext data block, the method comprising the steps of:

converting the plaintext data block into a first intermediate data block according to a first encrypting process which uses a first key signal as its key and the plaintext data block as its data input;

converting said first intermediate data block into a second intermediate data block according to a second encrypting process which uses said first intermediate data block as its data input and uses a second key signal as its key, wherein said second encrypting process is an involutory transformation of its data input; and converting said second intermediate data block into the ciphertext data block according to an encrypting process which is an inverse transformation of said first encrypting process using said first key signal as its key and said second intermediate data block as its data input.

* * * * *

UNITED STATES PATENT AND TRADEMARK OFFICE
CERTIFICATE OF CORRECTION

PATENT NO. : 5,594,797

DATED : January 14, 1997

INVENTOR(S) : Seppo Alanärä, Thomas Berson

It is certified that error appears in the above-identified patent and that said Letters Patent is hereby corrected as shown below:

At Col. 8, line 25, replace "CRYPT/CLEAR#" with --CLEAR/CRYPT#--

Signed and Sealed this

Sixth Day of May, 1997

Attest:

BRUCE LEHMAN

Attesting Officer

Commissioner of Patents and Trademarks